(No Model.) 2 Sheets—Sheet 1.

O. PAGÁN.
PROPELLER.

No. 548,655. Patented Oct. 29, 1895.

Witnesses:
F. D. Goodwin
Chas. De Cou

Inventor:
Orestes Pagán
by his Attorneys
Howson & Howson (No Model.) 2 Sheets—Sheet 2.
O. PAGÁN.
PROPELLER.
No. 548,655. Patented Oct. 29, 1895.
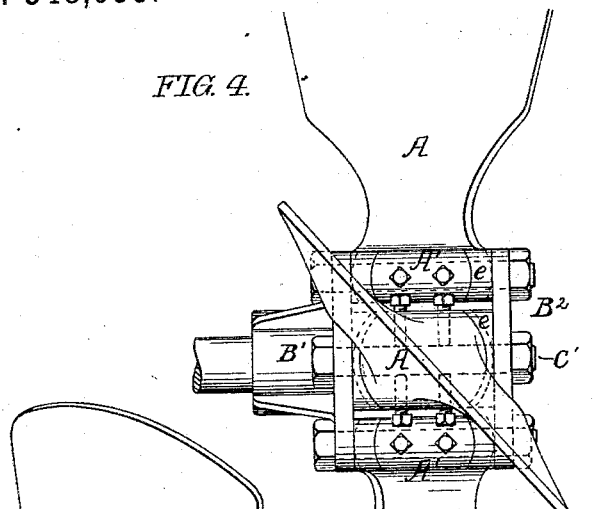
FIG. 4.
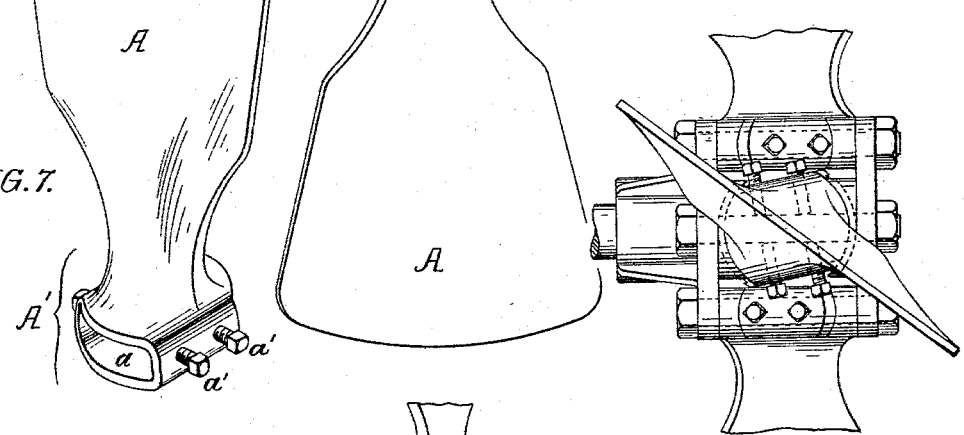
FIG. 7. FIG. 5.
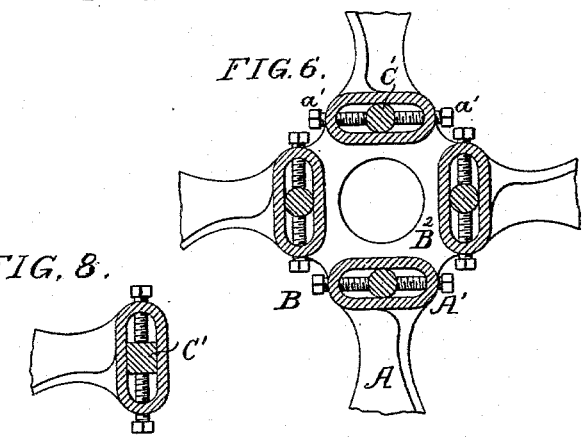
FIG. 6.
FIG. 8.
Witnesses:
H. D. Goodwin
Chas. De Cow.
Inventor:
Orestes Pagán
by his Attorneys
Howson & Howson

UNITED STATES PATENT OFFICE.

ORESTES PAGÁN, OF PHILADELPHIA, PENNSYLVANIA, ASSIGNOR OF TWO-THIRDS TO JOSIAH K. BOUGHER AND HOWARD EVANS, OF SAME PLACE.

PROPELLER.

SPECIFICATION forming part of Letters Patent No. 548,655, dated October 29, 1895.

Application filed January 31, 1895. Serial No. 536,839. (No model.)

*To all whom it may concern:*

Be it known that I, ORESTES PAGÁN, a citizen of the United States, residing in Philadelphia, Pennsylvania, have invented certain Improvements in Propellers, of which the following is a specification.

The object of my invention is to so construct a screw-propeller that it will draw the full supply of water necessary for its area of blade surface only from the direction in which the vessel is advancing. This object I attain by making a hollow hub, so as to destroy the vacuum that is formed in propellers now in general use.

Figure 1:
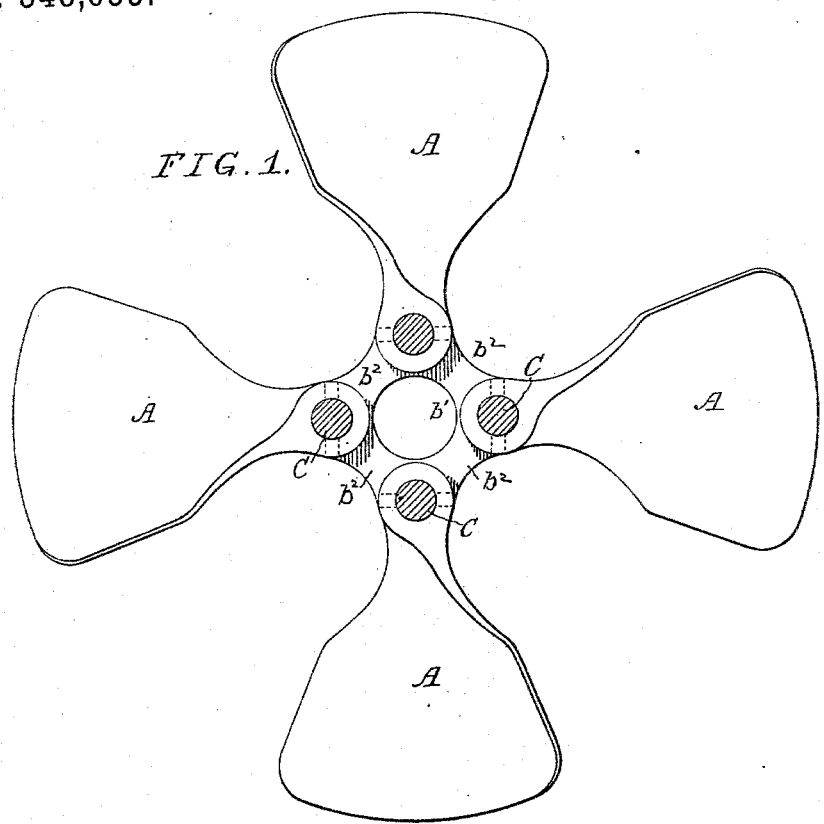
Figure 2:
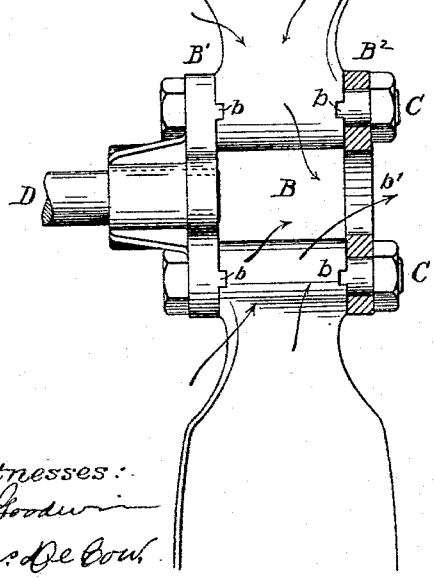
Figure 3:
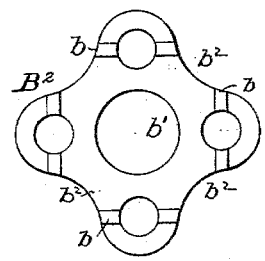

In the accompanying drawings, Figure 1 is a view of my improved propeller with the hub in section. Fig. 2 is a side view, partly in section. Fig. 3 is a detached view of one of the hub-sections. Fig. 4 is a side view showing means for adjusting the blades of the propeller. Fig. 5 is a view similar to Fig. 4, with the exception that the blades are adjusted at a different angle. Fig. 6 is a section on the line 6 6, Fig. 4. Fig. 7 is a detached view of one of the blades. Fig. 8 is a view of a modification.

Referring in the first instance to Figs. 1, 2, and 3, A are the blades—four in the present instance—and each blade is mounted on a bolt C. These bolts pass through the two heads B' B² of the propeller-hub B.

The blades are prevented from turning on the bolts by lugs $b$, (shown clearly in Figs. 2 and 3,) which enter cavities in the blades. Other devices may be used to lock the blades to the hub-sections without departing from my invention.

The hub is made hollow, as shown, and the section B² has a large central opening $b'$ for the free escape of water. Channels $b^2$ are also formed between the blades at the hub, so as to allow for the free passage of water into and through the hub, thus destroying the vacuum usually formed in propellers having solid hubs.

The section B' of the hub is shaped to receive the end of the propeller-shaft D, which terminates in this section, thus leaving the body of the hub open for the free passage of water.

It will be understood that in some instances the hub and blades may be cast in a single piece, providing the hub is open at the center in line with the blades and has an outlet at the rear for the free escape of water.

In Figs. 1, 2, and 3 I have shown a propeller with fixed blades, while in Figs. 4 to 8, inclusive, I have illustrated a propeller having adjustable blades, so that the blades can be set at different angles.

The base-section A' of each blade has a passage $a$ for a bolt C', the passage being of such a width that the blades can be turned to the two extreme points, and passing through each side of the base portion are set-screws $a'$, upon adjusting which the blades can be locked at any desired pitch. In the present instance the screws bear upon the bolts, as clearly shown in Fig. 6.

I have shown round bolts in Fig. 6; but square bolts may be used, as shown in Fig. 8.

The hub-section has curved sockets $e$, to which are adapted the curved bases of the blades, so that when the parts are adjusted a neat fit is insured.

By making the propeller with independent blades any one of the blades can be readily replaced or can be removed, repaired, and readjusted in position, and by securing the hub-section B' only to the shaft the blades can be readily removed without disturbing this hub-section.

By the construction shown I am enabled to make a propeller with two or more blades that will not churn the water within its disk, as the water is free to escape through the hub and destroy the vacuum.

As the propeller entirely frees itself from water, it does not carry a mass of water around within its disk, thus decreasing the liability of breakage.

I claim as my invention—

1. The combination in a propeller, of the hollow hub open at the rear, blades projecting from said hub and passages in the hub between the blades, said passages communicating with the opening at the rear, substantially as described.

2. The combination in a propeller, of the independent blades, means for adjusting the blades, with a hollow hub having passages between the blades communicating with the central opening, substantially as set forth.

3. The combination of the blades having base sections, hub sections B' and B² and bolts passing through the base sections of the blades and through the hub section, the structure forming a passage at the center of the propeller for the free escape of water, substantially as described.

4. The combination in a propeller, of the skeleton hub open at the rear, blades projecting from said hub, openings in the hub between the blades, said openings communicating with the open center, with a propeller shaft stopping short of the center of the blades so as to allow for the free passage of water to the center through the openings between the blades, substantially as described.

5. The combination of the independent blades, each having a perforated base section, hub sections B' and B², the hub section B' formed to receive the propeller shaft, the section B² having a central opening for the escape of water, with bolts passing through the said sections and through the base of each blade, substantially as described.

6. The combination of the sections B' and B² of the hub, the shaft secured to one section, curved sockets on the sections, blades having bases adapted to said sockets, openings in each base, bolts adapted to the openings and to the hub sections and set screws for locking the blades, substantially as described.

In testimony whereof I have signed my name to this specification in the presence of two subscribing witnesses.

ORESTES PAGÁN.

Witnesses:
WILL. A. BARR,
JOSEPH H. KLEIN.